Patented Dec. 13, 1932

1,891,210

UNITED STATES PATENT OFFICE

HANS WOLFF, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

GREEN MINERAL PIGMENT

No Drawing. Application filed November 5, 1931, Serial No 573,295, and in Germany November 6, 1930.

The present invention relates to green mineral pigments consisting of mixed crystals.

I have found that mixed crystals consisting of from 5 to 75 per cent by weight of magnesium orthotitanate ($Mg_2TiO_4$), at least 5 per cent of cobalt chromite ($CoCr_2O_4$) and any remainder of a chromite of nickel, zinc or magnesium are brilliant green mineral colors having great fastness to alkalies, acids and light. Moreover, these pigment colors withstand high temperatures so that they are particularly suitable as pigment colors for ceramic materials. The isomorphous admixture of magnesium orthotitanate with cobalt chromite has the effect of displacing the somewhat bluish color of cobalt chromite towards pure green. By the isomorphous admixture of one or more of the said other chromites with the mixed crystals of cobalt chromite and magnesium orthotitanate, the consumption of the expensive cobalt compound can be substantially reduced without the excellent tinctorial properties of the cobalt chromite-magnesium orthotitanate pigments suffering any appreciable deterioration.

The mixed crystal pigments may be prepared by melting the components in the desired proportion, or by heating together the oxides, hydroxides, carbonates or other compounds of the metals concerned which are converted into oxides by heating. Compounds which are converted into oxides when heated in the presence of water, as for example titanium chloride, may also be employed as initial materials.

The following examples will further illustrate the nature of this invention but the invention is not restricted to these examples. The parts are by weight.

Example 1

For the preparation of a mixed crystal color pigment consisting of $(Co,Mg)Cr_2O_4$ and $Mg_2TiO_4$ in the molecular ratio $$(Co,Mg)Cr_2O_4 : Mg_2TiO_4 = 4:1$$

in which the proportion of Co:Mg in the chromite is 1:3 and which therefore corresponds to the molecular composition $$CoCr_2O_4 : MgCr_2O_4 : Mg_2TiO_4 = 1:3:1.$$

61 parts of chromium oxide ($Cr_2O_3$) are dissolved in the necessary amount of sulphuric acid whereupon 28 parts of cobalt sulphate, 123 parts of crystallized magnesium sulphate and 8 parts of titanium dioxide are added to the solution. The mixture is then evaporated to dryness, ground and heated to red heat for about 3 hours whereby the sulphuric acid is volatilized. A very fine-grained brilliant green pigment is obtained which has a very good fastness to acids, alkalies and light.

Example 2

For the preparation of a mixed crystal color pigment consisting of $(Co,Zn)Cr_2O_4$ and $Mg_2TiO_4$ in the molecular ratio 1:1 in which the proportion of Co:Zn is 1:1 and which, therefore, corresponds to the molecular composition $$CoCr_2O_4 : ZnCr_2O_4 : Mg_2TiO_4 = 1:1:2.$$

An intimate mixture of 28 parts of $CoSO_4$, 29 parts of zinc sulphate, 98 parts of crystallized magnesium sulphate, 160 parts of chromium nitrate and 16 parts of titanium dioxide is slowly heated to red heat and kept thereat for about 3 hours. A green powder is obtained having similar properties to the pigment described in the foregoing example.

Example 3

For the preparation of a mixed crystal color pigment consisting of $$(Co,Ni,Mg)Cr_2O_4$$

and $Mg_2TiO_4$ in the molecular ratio 4:1 in which the proportion of the metals in the chromite is Co:Ni:Mg=1:1:6 and which, therefore, corresponds to the molecular composition $$CoCr_2O_4 : NiCr_2O_4 : MgCr_2O_4 :$$
$$Mg_2TiO_4 = 1:1:6:2.$$

61 parts of chromium oxide ($Cr_2O_3$) are dissolved in the necessary amount of sulphuric acid whereupon 14 parts of cobalt sulphate, 14 parts of nickel sulphate, 123 parts of crystallized magnesium sulphate and 8 parts of titanium dioxide are added to the solution.

The mixture is then evaporated to dryness, ground and heated to red heat for about 3 hours. The pigment thus obtained is similar to that described in Example 1.

What I claim is:—

1. As new articles of manufacture pigment colors consisting of from 5 to 75 per cent by weight of magnesium orthotitanate, at least 5 per cent by weight of cobalt chromite and any remainder up to 100 per cent of a chromite of a metal selected from the group consisting of nickel, zinc and magnesium.

2. As new article of manufacture the pigment color consisting of mixed crystals of cobalt chromite, magnesium chromite and magnesium orthotitanate in the molecular ratio 1:3:1.

3. As new article of manufacture the pigment color consisting of mixed crystals of cobalt chromite, zinc chromite and magnesium orthotitanate in the molecular ratio 1:1:2.

4. As new article of manufacture the pigment color consisting of mixed crystals of cobalt chromite, nickel chromite, magnesium chromite and magnesium orthotitanate in the molecular ratio 1:1:6:2.

In testimony whereof I have hereunto set my hand.

HANS WOLFF.